United States Patent [19]

Olechowski

[11] 3,720,725
[45] March 13, 1973

[54] ALKYLATION PROCESS
[75] Inventor: Jerome Robert Olechowski, Trenton, N.J.
[73] Assignee: Cities Service Company, New York, N.Y.
[22] Filed: June 25, 1971
[21] Appl. No.: 157,044

[52] U.S. Cl..........260/671 C, 260/671 R, 260/671 P
[51] Int. Cl..................................................C07c 3/56
[58] Field of Search............260/671 R, 671 C, 671 P

[56] References Cited

UNITED STATES PATENTS 3,129,256  4/1964  Hay et al............................260/671 P

Primary Examiner—Curtis R. Davis
Attorney—J. Richard Geaman

[57] ABSTRACT

An aromatic hydrocarbon, such as benzene or toluene, is alkylated with an alkene while in contact with a catalyst composition comprising a molybdenum halide, an alkylaluminum dihalide, and a proton donor. In accordance with preferred embodiments of the invention, the alkene is a normally gaseous alkene, and the catalyst composition consists essentially of molybdenum pentachloride, ethyl aluminum dichloride, and ethanol. The nature of the product may be varied by adding the alkene before or after the catalyst composition.

7 Claims, No Drawings

ALKYLATION PROCESS

BACKGROUND OF THE INVENTION

1. Field of the Invention

This invention relates to the alkylation of aromatic hydrocarbons and more particularly relates to such an alkylation in the presence of a coordination catalyst system.

2. Description of the Prior Art

As disclosed in George A. Olah, "Friedel-Crafts and Related Reactions," Volume II, Interscience Publishers (New York), 1963, it is known to use various Friedel-Crafts catalysts for the alkylation of aromatic hydrocarbons. However, the reactions thus catalyzed are rather slow, even at elevated temperatures.

The use of a tungsten hexachloride-ethyl aluminum dichloride catalyst system for the alkylation of aromatic hydrocarbons was recently reported by Vipin M. Kothari and James J. Tazuma in "Behavior of $WCl_6$—$C_2H_5AlCl_2$ Cocatalyst System in Metathesis, Isomerization, and Alkylation Reactions," a paper presented before the Division of Petroleum Chemistry at the Chicago meeting of the American Chemical Society, September 13-18, 1970. Subsequently, James R. Graham and Lynn H. Slaugh reported that tungsten hexachloride or molybdenum pentachloride could be used alone as the alkylation catalyst. ("Alkylation Behavior of $WCl_6$, $MoCl_5$ and the Metathesis Cocatalyst System $WCl_6$—$C_2H_5AlCl_2$," TETRAHEDRON LETTERS, No. 11, pp. 787-788, 1971.) The molybdenum catalyst was reported to be more active but to have a tendency to form more polymeric by-product.

SUMMARY OF THE INVENTION

An object of this invention is to provide a novel and rapid process for alkylating aromatic hydrocarbons.

Another object is to provide such a process having a high yield of alkylated aromatic hydrocarbons.

These and other objects are attained by contacting an aromatic hydrocarbon with an alkene and a catalyst composition consisting essentially of a molybdenum halide, an alkylaluminum dihalide, and a proton donor selected from glycols and compounds corresponding to the formula ROH wherein R is hydrogen, alkyl, aryl, alkaryl, or aralkyl and wherein any alkyl group contains up to five carbon atoms and any aryl group is phenyl or naphthyl.

DESCRIPTION OF THE PREFERRED EMBODIMENTS

The aromatic hydrocarbon which is alkylated in accordance with the present invention may be one or more aromatic hydrocarbons having at least one unsubstituted ring carbon atom. Ordinarily it contains 6-14 carbon atoms. Typical of such aromatic hydrocarbons are benzene, toluene, xylene, naphthalene, anthracene, phenanthrene, biphenyl, etc.

The alkene may be one or more gaseous alkenes such as ethylene, propylene, butene-1, butene-2, pentene-1, pentene-2, hexene-1, hexene-2, 2,3-dimethylbutene-1, heptene-1, heptene-2, octene-1, octene-2, 3-methylheptene-2, nonene-1, nonene-2, decene-1, decene-2, etc. The normally gaseous alkenes, i.e., those containing 2-4 carbon atoms, are preferred. The amount of alkene employed is not critical and varies with the products desired. Ordinarily, the amount of alkene does not exceed about 3 mols per mol of aromatic hydrocarbon. It is frequently preferable to meter the alkene into the reaction vessel, e.g., by maintaining a substantially constant alkene pressure, to minimize side reactions such as polymerization.

The molybdenum halide of the catalyst composition may be one or more of such halides, preferably a di-, tri-, or pentachloride or bromide. Molybdenum pentachloride is particularly preferred. Ordinarily the molybdenum halide is employed in an amount such as to provide about 0.0002-0.01, preferably about 0.0003-0.0004, mol of molybdenum per mol of aromatic hydrocarbon being alkylated.

The alkylaluminum dihalide is preferably a dichloride or dibromide of an alkylaluminum in which the alkyl radical contains 2-4 carbon atoms. Exemplary of such compounds are the ethyl, propyl, isopropyl, butyl, and isobutyl aluminum dichlorides and dibromides. Most preferably this catalyst component is ethyl aluminum dichloride. It is usually employed in an amount such as to provide an aluminum/molybdenum mol ratio of about 0.5-15, preferably about 0.75-5, most preferably about four.

The proton donor may be one or more compounds selected from glycols and compounds corresponding to the formula ROH wherein R is hydrogen, alkyl, aryl, alkaryl, or aralkyl and wherein any alkyl group contains up to five carbon atoms and any aryl group is phenyl or naphthyl. Exemplary of such compounds are water, ethylene glycol, propylene glycol, pentylene glycol, methanol, ethanol, propanol, isopropanol, butanol-1, butanol-2, t-butanol, the pentanols, phenol, alpha- and beta-naphthols, cresols, xylenols, benzyl alcohol, etc. Preferably the proton donor is an alkanol containing 1-5 carbon atoms, especially ethanol. The proton donor is usually employed in an amount such as to provide a proton donor/molybdenum mol ratio of about 1-6, preferably about 1-3, most preferably about one.

The manner in which the aromatic hydrocarbon is contacted with the catalyst composition is not critical. If desired, the catalyst components may be mixed together and allowed to react with one another before being added to the reaction mixture. However, it is usually preferable to form the catalyst in situ by adding the catalyst components separately to a reaction mixture containing the aromatic hydrocarbon to be alkylated. A particularly desirable method is to mix the proton donor with a solution of the molybdenum halide in an aromatic hydrocarbon solvent such as benzene, toluene, xylene, etc., add the resultant solution to the aromatic hydrocarbon to be alkylated, and then add the organometallic compound. When it is desired to maximize the amount of alkylation accomplished by the dimer of the alkene, the alkene is added to the aromatic hydrocarbon before the catalyst components. Conversely, the alkene is added after the catalyst components when it is desired to minimize alkylation with the dimer.

The reaction temperature is maintained above the freezing point and below the boiling point of the aromatic hydrocarbon being alkylated, alkylation being more rapid at the higher reaction temperatures. Ordinarily the reaction temperature is in the range of about 20°–120°C. The reaction may be conducted at atmospheric, subatmospheric, or superatmospheric pressure. When the alkene is not normally gaseous, subatmospheric pressures sufficient to render it gaseous should be employed.

The time required for the reaction varies from about 30 minutes to several hours, depending on the temperature employed and the degree of alkylation desired. However, a particular advantage of the process of the invention is that it can be conducted so as to achieve desirable degrees of alkylation in a short time, e.g., about 1–2 hours.

The process is conducted in the substantial absence of catalyst poisons such as oxygen and carbon dioxide. Thus, before the catalyst components are added, air is evacuated from the reaction vessel. The air may be replaced by the gaseous alkene or, when it is desired to form the catalyst in the absence of the alkene, by an inert atmosphere such as nitrogen, helium, argon, etc. Since the alkylation reaction is exothermic, large reaction batches may require cooling, such as by refrigerated reflux condensation.

When the desired degree of alkylation is attained, the reaction may be terminated by any conventional technique, e.g., by the addition of an excess of water, methanol, ethanol, or isopropanol. The products may then be recovered by any conventional technique.

The following examples are given to illustrate the invention and are not intended as a limitation thereof. Unless otherwise specified, quantities mentioned are quantities by weight.

EXAMPLE I

Prepare solution A by intimately mixing 0.084 part (1.83 molar proportions) of ethanol with a solution of 0.5 part (1.83 molar proportions) of molybdenum pentachloride in 35 parts of anhydrous benzene.

Prepare solution B by dissolving 0.93 part (7.32 molar proportions) of ethyl aluminum dichloride in hexane to form a 20 percent solution.

Charge a suitable reaction vessel with 400 parts of benzene, and purge the reaction vessel with ethylene. Add solution A with agitation and then solution B. When the pressure in the vessel goes from 6 psi to a vacuum, pressurize with 50 psi of ethylene. The temperature rises to 50°C. and then returns to room temperature, while the ethylene pressure is maintained at 50 psi and the benzene takes up 92 psi of ethylene. After stirring for one hour at room temperature while an additional 4 psi of ethylene are taken up, add methanol to hydrolyze the catalyst.

The process results in a high yield of alkylated benzenes with little formation of polyethylene. The product comprises 49% of ethylbenzene and 43.8 percent of sec-butylbenzene.

EXAMPLE II

Prepare solutions A and B as in Example I.

Charge a suitable reaction vessel with 400 parts of benzene and purge with nitrogen. Add solution A with agitation and then solution B. Pressurize the vessel with 50 psi of ethylene and maintain this pressure throughout the reaction. The temperature rises to 35°C. and then returns to room temperature. Terminate the reaction by adding methanol to hydrolyze the catalyst.

The process results in a high yield of alkylated benzenes with no apparent formation of polyethylene. The product comprises 82.8% of ethylbenzene and 17.8 percent of sec-butylbenzene.

EXAMPLE III

Repeat Example I except for substituting 400 parts of toluene for the 400 parts of benzene. The temperature initially rises to 35°C. and then returns to room temperature, while the ethylene pressure is maintained at 50 psi and the toluene takes up 52 psi of ethylene. An additional 2 psi of ethylene are taken up while the reaction mixture is being stirred for one hour at room temperature.

The process results in a high yield of alkylated toluenes with no appreciable formation of polyethylene. The product comprises 16.85% of p-ethyltoluene, 14.11 percent of p-ethyltoluene, 1.51 percent of m-ethyltoluene, 12.64 percent of o-sec-butyltoluene, 23.87 percent of m-sec-butyltoluene, and 26.91 percent of p-sec-butyltoluene.

EXAMPLE IV

Repeat Example III except for (1) heating the reaction mixture to 50°C. before adding the catalyst components and (2) stirring for one hour at 50°C. after the exotherm has subsided. A total of 62 psi of ethylene are taken up.

The process results in a high yield of alkylated toluenes with little formation of polyethylene. The product comprises 45.07 percent of o-ethyltoluene, 38.32 percent of p-ethyltoluene, 3.15 percent of m-ethyltoluene, 0.29 percent of o-sec-butyltoluene, 1.18 percent of m-sec-butyltoluene, and 3.56 percent of p-sec-butyltoluene.

Similar results are observed when the materials specified in the foregoing examples are replaced by materials taught in the specification to be equivalents thereof.

It is obvious that many variations may be made in the products and processes above without departing from the spirit and scope of this invention.

What is claimed is:

1. An alkylation process which comprises contacting an aromatic hydrocarbon with an alkene and a catalyst composition consisting essentially of one molar proportion of a molybdenum halide, about four molar proportions of an alkylaluminum dihalide, and about one molar proportion of a proton donor selected from glycols and compounds corresponding to the formula ROH wherein R is hydrogen, alkyl, aryl, alkaryl, or aralkyl and wherein any alkyl group contains up to five carbon atoms and any aryl group is phenyl or naphthyl.

2. The process of claim 1 wherein the alkene is initially contacted with the aromatic hydrocarbon in the absence of the catalyst composition.

3. The process of claim 1 wherein the catalyst composition is initially contacted with the aromatic hydrocarbon in the absence of the alkene.

4. The process of claim 1 wherein the alkene contains 2–4 carbon atoms.

5. The process of claim 4 wherein the alkene is ethylene.

6. The process of claim 1 wherein the catalyst composition consists essentially of molybdenum pentachloride, ethyl aluminum dichloride, and ethanol.

7. The process of claim 6 wherein the catalyst composition consists essentially of one molar proportion of molybdenum pentachloride, about four molar proportions of ethyl aluminum dichloride, and about one molar proportion of ethanol.

* * * * *